US010736722B2

(12) United States Patent
Wolfsberger et al.

(10) Patent No.: US 10,736,722 B2
(45) Date of Patent: Aug. 11, 2020

(54) APPARATUS FOR LIFTING AND POSITIONING FOUR-LEGGED ANIMALS

(71) Applicants: Erwin Wolfsberger, Viernheim (DE); Anja Wolfsberger, Viernheim (DE)

(72) Inventors: Erwin Wolfsberger, Viernheim (DE); Anja Wolfsberger, Viernheim (DE)

( * ) Notice: Subject to any disclaimer, the term of this patent is extended or adjusted under 35 U.S.C. 154(b) by 0 days.

(21) Appl. No.: 15/102,179

(22) PCT Filed: Dec. 8, 2014

(86) PCT No.: PCT/DE2014/200688
§ 371 (c)(1),
(2) Date: Jun. 6, 2016

(87) PCT Pub. No.: WO2015/081956
PCT Pub. Date: Jun. 11, 2015

(65) Prior Publication Data
US 2016/0302902 A1 Oct. 20, 2016

(30) Foreign Application Priority Data

Dec. 6, 2013 (DE) .................. 10 2013 225 201

(51) Int. Cl.
*A61D 3/00* (2006.01)
*A61G 13/06* (2006.01)
(Continued)

(52) U.S. Cl.
CPC .................. *A61D 3/00* (2013.01); *A01K 1/06* (2013.01); *A01K 13/00* (2013.01); *A01K 15/00* (2013.01);
(Continued)

(58) Field of Classification Search
USPC ......... 119/753–757, 728, 725, 727, 843, 846
See application file for complete search history.

(56) References Cited

U.S. PATENT DOCUMENTS 346,285 A * 7/1886 Hime ...................... A01K 1/06
119/725
1,015,239 A * 1/1912 Miller .................. A01K 1/0613
119/725
(Continued)

FOREIGN PATENT DOCUMENTS

| DE | 3707005 A1 | 9/1988 |
|---|---|---|
| DE | 19839176 A1 | 3/2000 |

(Continued)

OTHER PUBLICATIONS

The International Bureau of WIPO, International Preliminary Report on Patentability (English translation of ISA's Written Opinion) for International Application No. PCT/DE2014/200688, dated Jun. 7, 2016, 6 pages, Switzerland.

(Continued)

*Primary Examiner* — Andrea M Valenti
(74) *Attorney, Agent, or Firm* — Alston & Bird LLP

(57) ABSTRACT

Disclosed is an apparatus for lifting and positioning four-legged animals, in particular dogs, comprising a main frame to be placed on the ground or floor, and a lifting device (2) supported by the main frame. The lifting device (2) comprises a vertically positioned or positionable column (3) that includes a vertically adjustable lifting cross-beam (4) and bars (5) which project from the lifting cross-beam (4), preferably in an orthogonal direction, and which support a mat, a cloth, a net or a plurality of straps acting as a holder for the animal.

26 Claims, 6 Drawing Sheets

(51) Int. Cl.
*A01K 13/00* (2006.01)
*A01K 15/04* (2006.01)
*A61G 7/10* (2006.01)
*A61G 13/10* (2006.01)
*A01K 15/00* (2006.01)
*A01K 1/06* (2006.01)

(52) U.S. Cl.
CPC ............ *A01K 15/04* (2013.01); *A61G 7/1019* (2013.01); *A61G 7/1046* (2013.01); *A61G 7/1051* (2013.01); *A61G 13/06* (2013.01); *A61G 13/104* (2013.01)

(56) References Cited

U.S. PATENT DOCUMENTS

| | | | | |
|---|---|---|---|---|
| 2,804,174 | A * | 8/1957 | Chasar | B66F 9/08 187/232 |
| 3,208,432 | A * | 9/1965 | Fisk | A01K 13/00 119/756 |
| 3,385,401 | A * | 5/1968 | Campbell | B66B 9/16 187/222 |
| 3,876,039 | A * | 4/1975 | Bushnell, Jr. | B66F 9/06 187/226 |
| 4,421,209 | A * | 12/1983 | Vermette | B66F 9/07559 182/129 |
| RE32,052 | E * | 12/1985 | Rosenberg | A61D 3/00 119/756 |
| 4,987,976 | A * | 1/1991 | Daugherty | B66B 9/16 16/331 |
| 5,584,363 | A * | 12/1996 | Curtin | B66B 9/16 187/232 |
| 6,101,956 | A | 8/2000 | Keil | |
| 6,371,449 | B1 * | 4/2002 | Chamberlain | B25H 1/0014 254/10 C |
| 6,477,986 | B1 * | 11/2002 | Korjenic | A01K 1/0613 119/757 |
| D568,550 | S * | 5/2008 | Totty | D30/158 |
| D583,518 | S * | 12/2008 | Thorner | D30/151 |
| 8,051,807 | B2 * | 11/2011 | Winders | A01K 1/0613 119/728 |
| 9,055,738 | B1 * | 6/2015 | Woller | A01M 31/006 |
| 9,992,976 | B2 * | 6/2018 | Funk | A01K 15/00 |
| 2004/0025795 | A1 * | 2/2004 | Miale | A61D 3/00 119/28.5 |
| 2005/0042068 | A1 * | 2/2005 | Ehmen | B66F 9/06 414/661 |
| 2005/0166808 | A1 | 8/2005 | Keil | |
| 2007/0245977 | A1 | 10/2007 | Keil | |
| 2008/0223309 | A1 | 9/2008 | Winders | |
| 2012/0037089 | A1 * | 2/2012 | Puhl | A61D 3/00 119/725 |
| 2012/0085270 | A1 | 4/2012 | Schroer et al. | |
| 2012/0272925 | A1 * | 11/2012 | Melhorn | A01K 45/005 119/843 |

FOREIGN PATENT DOCUMENTS

| | | |
|---|---|---|
| DE | 19738516 C2 | 3/2003 |
| DE | 202004019854 U1 | 4/2005 |
| DE | 60301203 T2 | 6/2006 |
| DE | 102010036409 A1 | 1/2012 |
| EP | 1645536 A1 | 4/2006 |
| JP | 2003-180184 A | 7/2003 |
| WO | WO 1996/028017 A1 | 9/1996 |
| WO | WO 1997/030675 A1 | 8/1997 |
| WO | WO 1998/025540 A1 | 6/1998 |
| WO | WO 1999/066858 A1 | 12/1999 |

OTHER PUBLICATIONS

International Searching Authority, International Search Report (ISR) and Written Opinion for International Application No. PCT/DE2014/200688, dated May 4, 2015, 12 pages, European Patent Office, The Netherlands.

\* cited by examiner

APPARATUS FOR LIFTING AND POSITIONING FOUR-LEGGED ANIMALS

CROSS REFERENCE TO RELATED APPLICATIONS

This application is a national stage application, filed under 35 U.S.C. § 371, of International Application No. PCT/DE2014/200688, filed Dec. 8, 2014, which claims priority to German Application No. 10 2013 225 201.3, filed Dec. 6, 2013, the contents of both of which as are hereby incorporated by reference in their entirety.

BACKGROUND

Technical Field

The invention relates to a device for lifting and positioning four legged animals, in particular, dogs.

Related Art

Devices of the generic type are known from the field. Only for the sake of naming an example, reference is made to the German patent DE 20 2004 019 854 U1. This publication shows in the specific case a device for manually lifting and transporting domestic animals, where in this case a suspended mat that is wrapped like a strap around the animal from underneath is provided. On one side of this suspended mat a shoulder strap device is formed; and on the opposite side a handle is formed. This device conditionally allows, for example, a dog to be lifted, but this device does not lend itself to examining a lifted dog.

The German patent DE 603 01 203 T2 also discloses a device that is intended for carrying four legged domestic animals for the purpose of being able to carry the pet easily and safely and that is similar in design to a bag with slots in the bottom region for the legs.

Furthermore, the publication WO 99/66858 discloses a device for lifting animals, said device comprising a type of cart with a main frame that can be folded open. The handling is cumbersome; and at best the animal can be secured by means of belts. In this respect this device is complicated and, as a result, unsatisfactory.

Furthermore, lifting devices of very different designs, which are intended for lifting persons, are known from the field. For example, the German patent DE 198 39 176 A1 describes a bath lifter for disabled and frail persons as well as for sick persons. The situation is similar with the publication WO 97/30675, which discloses a device for lifting disabled persons. The German patent DE 37 074 005 A1 discloses a stationary patient lift. The German patent DE 10 2010 036 409 A1 shows a mobile lift for persons. A device for lifting persons is also known from the German patent DE 197 38 516 C2.

However, the prior art devices for lifting humans and/or animals are problematic, in so far as their sole function is to lift. If an animal is to be lifted onto a treatment table, then a repositioning is required. That is, the animal has to be lifted manually out of the device. Such a maneuver is almost impossible, especially in the case of injured animals or animals with painful joints, since the animal, in particular, the dog tends to be aggressive when moved out of a painful, most likely defensive position. With the prior art devices it is not possible to handle such an animal/dog without risk; and treating a dog in such a device is not possible at all.

BRIEF SUMMARY

Therefore, the object of the present invention is to design and further develop a device for lifting and positioning four legged animals, in particular, dogs in such a way that this device, which is very simple in design, makes it possible to handle an animal, which is to be treated by the veterinarian, in an ideal way, while the animal is held in a secured position as painlessly as possible. At the same time it should not be necessary to manually reposition the animal for subsequent treatment.

The above object is achieved by means of the features disclosed in patent claim 1, according to which the device of the invention comprises a main frame, to be placed on the ground or floor, and a lifting device, supported by the main frame. The lifting device comprises a vertically positioned or positionable column that includes a vertically adjustable lifting cross beam and bars, which project from the lifting cross beam, preferably in an orthogonal direction. The bars support a mat, a cloth, a net or a plurality of straps, acting as a holder for the animal, so that the animal can be held or, more specifically, be securely positioned therein.

If a mat is provided to support the animal, then passages for the extremities have to be provided. The same applies to a corresponding cloth, net or the like. If straps are used, then these straps can be positioned and adjusted in length in such a way that any four legged animal can be securely held and carried.

The aforementioned holder can be adjusted to the size and shape of the animal. As a result, the device can be used for any animal, in particular, for four legged pets, in particular, for dogs of different sizes.

The lifting cross beam can be set or rather adjusted in width, so that in this respect, too, an optimal adaptability is achieved.

It is also conceivable that the lifting cross beam has different docking points for the bars, for example, in the form of mounting bolts or the like. It may also be provided that the lifting cross beam has recesses for inserting the bars. In any case the essential feature is that the bars can be secured along the cross beam at different positions.

In an additional advantageous embodiment the bars are adjustable in length, preferably in the form of telescoping bars.

It is also conceivable that, instead of the two bars, a panel can be attached directly to the cross beam, with corresponding docking means, optionally by means of a frame. Thus, a table can be attached to or, more specifically, a table can be generated at the vertically positionable column.

With respect to the lifting cross beam it is advantageous, if it runs in the column. According to a simple embodiment, the lifting cross beam can be raised or lowered by means of a toothed rack or a cable pull. In this respect it is conceivable that the lifting cross beam is manually operated by means of a crank or by means of an electric drive. The drive for the lifting cross beam can be implemented as an electric motor inside the column. It is also conceivable to arrange the motor outside of the column, so that in the context of such an embodiment the objective is to achieve an operative connection to the lifting cross beam.

The main frame can be configured as a U shaped frame. According to an even more advantageous embodiment, the legs of the main frame can be unfolded or rather spread apart towards the free end, in order to make the base larger and, in so doing, to increase the stability.

In terms of a mobile embodiment of the device, according to the invention, it is also advantageous to equip the main frame with preferably four wheels, which can be blocked in another advantageous fashion to ensure the stability of the device.

In order to operate the device, i.e., to lift the cross beam, a remote control may be provided, in order to be able to use, in particular, the basic functions of the device. This includes primarily the lifting function.

For the remote control it is possible to use a cell phone with a suitable organizer app or a suitable program, for a wireless, for example, WLAN connection.

The device can be equipped with any electrical or electrotechnical device in an even more advantageous way; in the simplest case the device can be equipped with an integral lighting, a receptacle for a medical device, etc.

At this stage there are a number of options for designing and further developing the teaching of the present invention in an advantageous way. For this purpose reference is made, on the one hand, to the patent claims subordinate to patent claim 1 and, on the other hand, to the following description of preferred exemplary embodiments of the invention with reference to the drawings. In conjunction with the description of the preferred exemplary embodiments of the invention with reference to the drawings, preferred embodiments and further developments of the teaching are also explained in general. The drawings show in

DETAILED DESCRIPTION OF VARIOUS EMBODIMENTS

The figures show an exemplary embodiment of a device according to the invention, i.e., a device for lifting and positioning four legged pets, in particular, dogs. The device comprises a main frame 1 that is to be placed on the ground or floor. The main frame 1 supports a lifting device, where in this case the lifting device 2 comprises a vertically positionable column 3. The column 2 includes a vertically adjustable lifting cross beam 4, which in turn comprises bars 5 that project from said lifting cross beam in the orthogonal direction. The bars 5 are used to hold a mat, a cloth, a net or a plurality of straps, acting as a holder for the animal or, more specifically, a dog. Preferably the straps can be connected to the two bars 5 in such a way that they can be slid. In the event that straps are provided, these straps could be adjustable in length by means of needle felt connections and, as a result, be optimally adaptable to the body of the animal.

Figure 1:
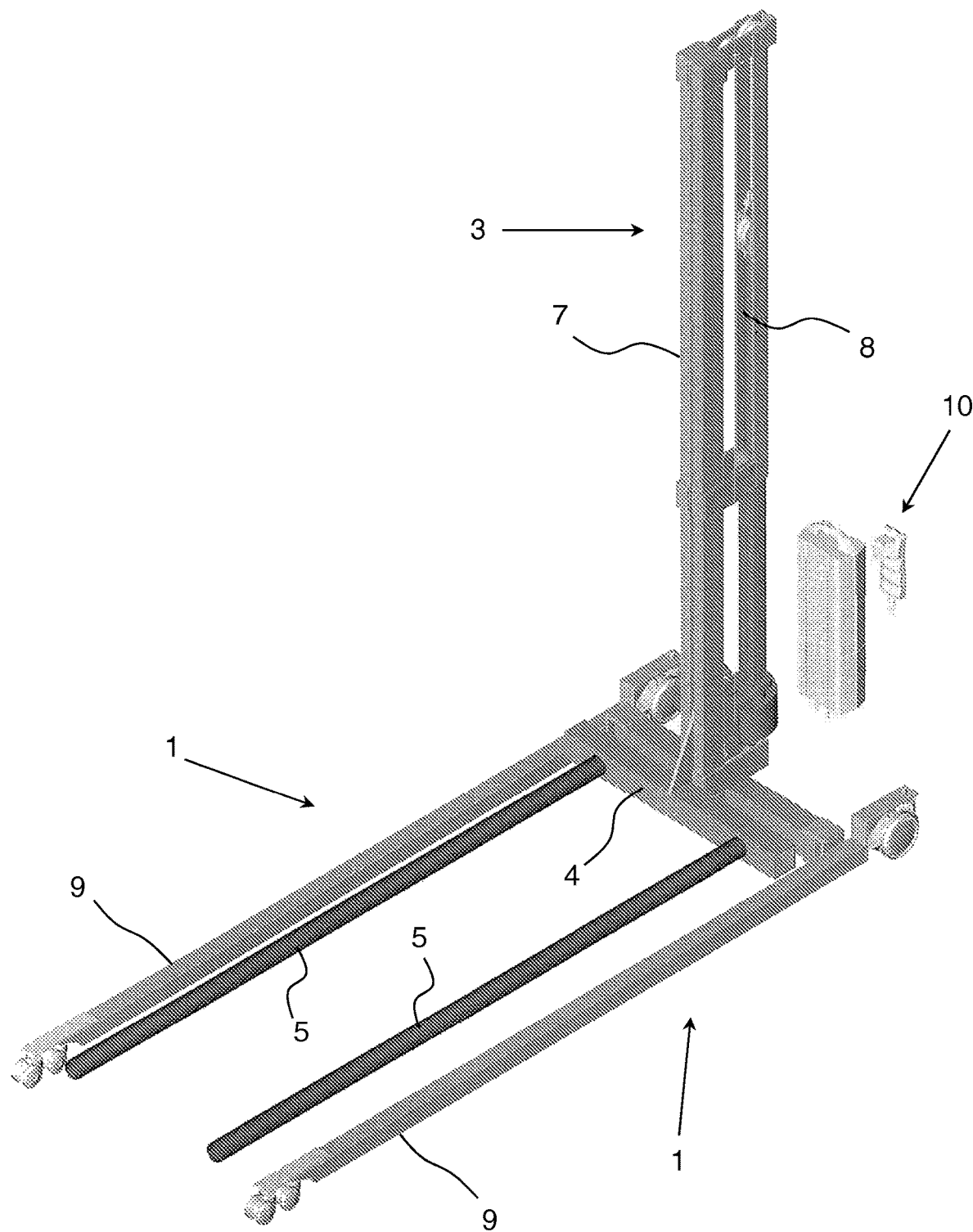
FIG. 1 in schematic form a view of an exemplary embodiment of an inventive device for lifting and positioning four legged animals, where in this case a lifting device, supported by the main frame, is located in the lowered position.

Furthermore, FIG. 1 shows that the main frame 1 comprises wheels 6 that are used to move the device. The wheels 6 may be constructed as single wheels or may be combined in pairs as double wheels, where in this case it is advantageous if the wheels 6 can be blocked, in order to be able to ensure, in particular, that the device is securely positioned.

In the exemplary embodiment shown in the figures, the column 3 is designed in such a way that the lifting cross beam 4 runs in the column 3. The lifting cross beam 4 can be raised and lowered by means of a toothed rack or a cable pull (not shown in the figures). For the drive there is an electric drive that can be provided inside the column 3.

In the exemplary embodiment shown in the figures, the column 3 includes a guide column 7 and a drive column 8, which is arranged behind said guide column.

Furthermore, the figures show that the main frame 1 is designed as a U shaped frame, where in this case it is in turn advantageous if the legs 9 of the main frame 1 can be unfolded or rather spread apart towards the free end, in order to make the base larger and, in so doing, to increase the stability.

Furthermore, it is indicated in the figures that a remote control 10 is provided to operate the basic functions: lifting and lowering.

Figure 2:
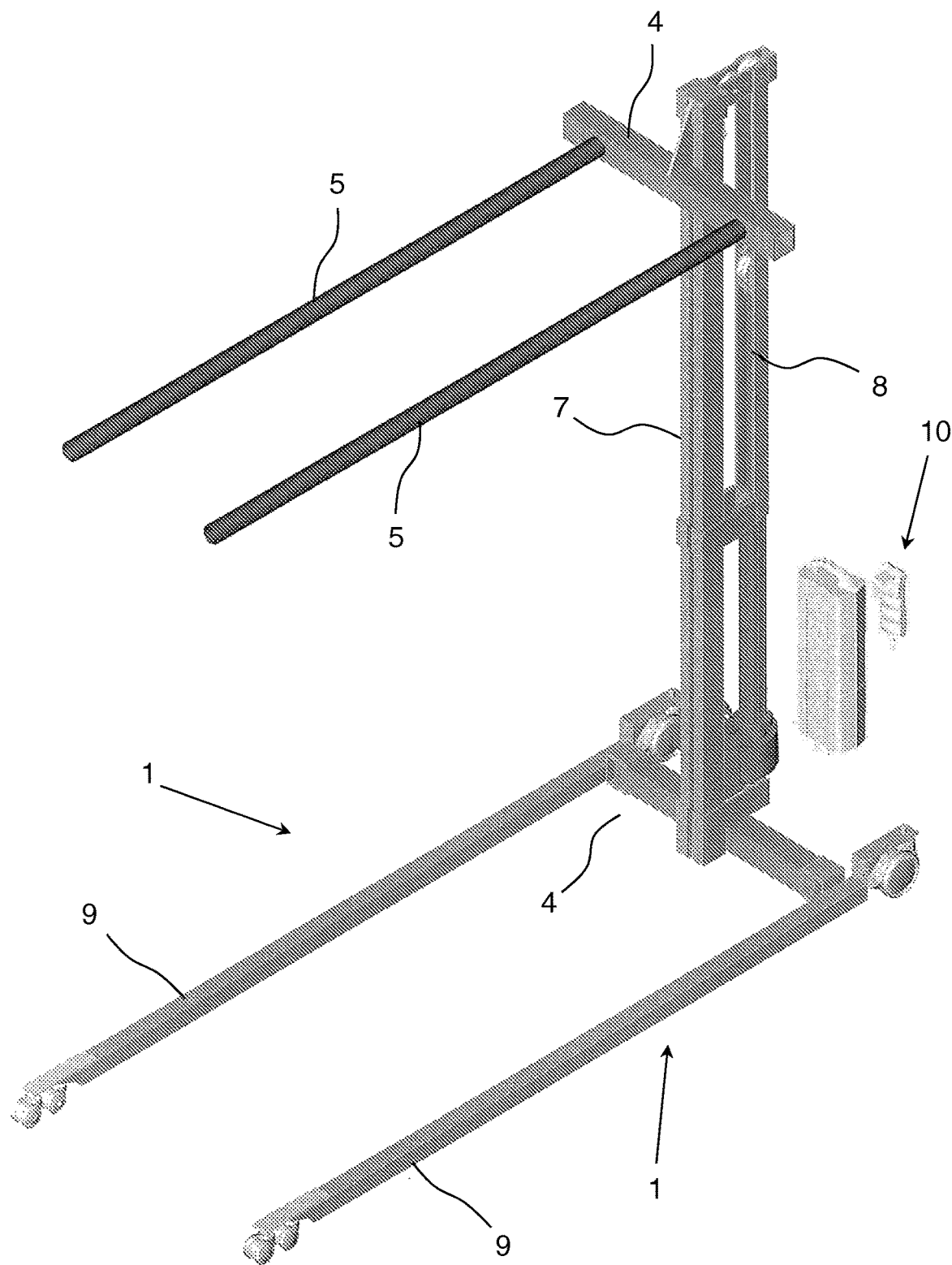
FIG. 2 in schematic form a view of an exemplary embodiment from FIG. 1, where in this case the lifting device is located in the raised, upper position.

FIG. 2 shows the device from FIG. 1 in the raised position, i.e. with the effect that the lifting cross beam 4 is moved upwards in the guide column 7, so that the two columns 3 are in the upper raised position. Belts (not shown in the figures), which are suspended from said cross beam, are used to hold and/or to carry the animal/dog in a secure position. In this position a medical examination or treatment can take place.

The "harness" for the animal may be made of a cloth or a tarp, to which a plurality of belts/straps can be attached with corresponding buckles, so that the cloth can be attached quickly and variably to the holder that is provided for this purpose. A corresponding number of straps with buckles, in this embodiment a total of 18 pieces, and a zipper or zippers, affixed to the underside, can be used to adjust the "harness" to almost any size of dog/animal. The belts and adjustable buckles offer the possibility of examining the animal quickly and without risk at almost any point on the body. To protect the staff, a head attachment (muzzle) can be attached to the holder.

The major advantage for the animal is the avoidance of anesthesia, because anesthesia is frequently the cause of death due to the wrong dosage and/or stress for the animal. In conjunction with an interchangeable table panel and due to the mobility of the device, this device can be used in a variety of ways in the veterinary practice.

Figure 3:
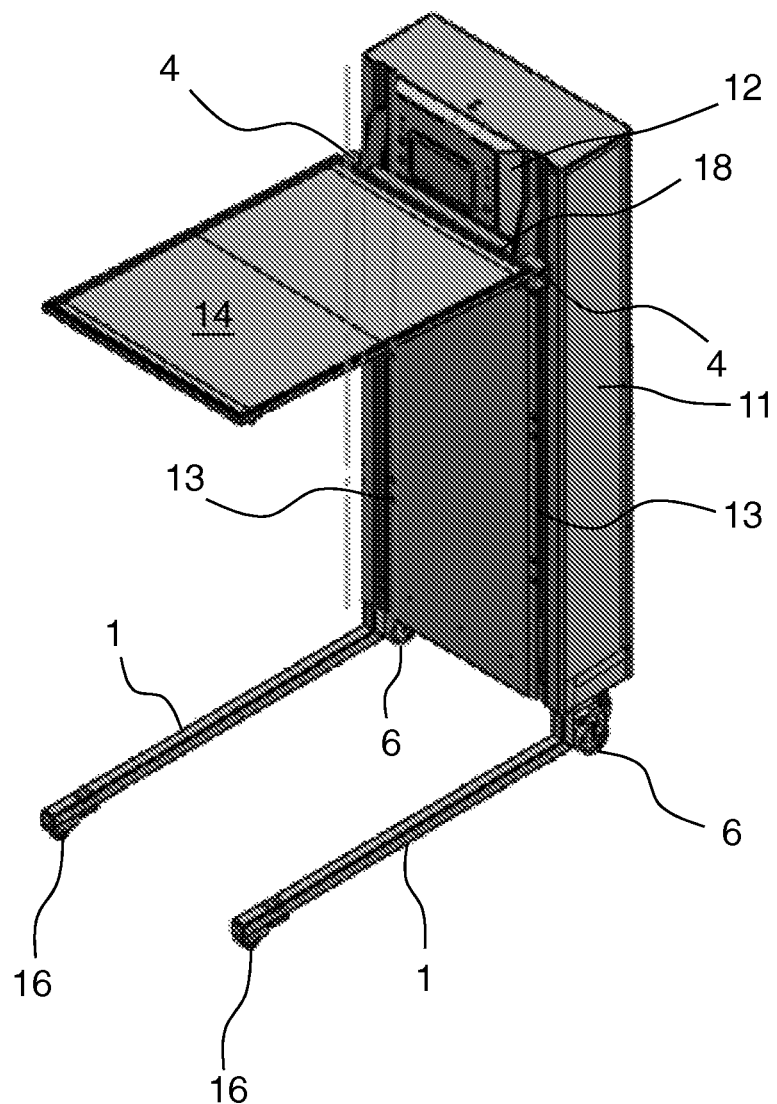
FIG. 3 in schematic form a view of an additional exemplary embodiment of the inventive device, where the lifting device is disposed in a housing.

FIG. 3 shows in schematic form a view of an additional exemplary embodiment of a device according to the invention, where in this case the lifting device or, more specifically, the lifting mechanism 12 is disposed in a housing 11. The housing 11 is designed to match the width of the main frame 1, so that it defines and limits the entire width of the device.

Inside the housing 11 there are two lifting mechanisms 12, which can be seen in FIG. 3 and which support the lifting cross beam 4. In order for the lifting cross beam 4 to extend from outside the housing 11 into the housing 11 and to be able to engage with two lifting mechanisms 12, the housing 11 is provided with vertical openings 13 or rather slots on the front side, i.e., on the treatment side of the device.

In the exemplary embodiment shown in FIG. 3, the lifting cross beam 4 supports a table 14, which is either placed on the bars 5 and is locked there or is provided with corresponding insertion bolts, instead of the bars 5, and is inserted into the lifting cross beam 4.

It should be noted at this point that both the table 14 and the bars 5 can be arranged with at least a slight slope towards the top, in order to take account of the load of a large dog, for example.

The lifting mechanisms 12, arranged in the housing 11, are driven preferably by means of a chain, which is travelling in the middle, and a corresponding connection by means of gearwheels and bars, if desired, with the interposition of a gearbox. An electric motor may be provided as the drive.

Figure 4:
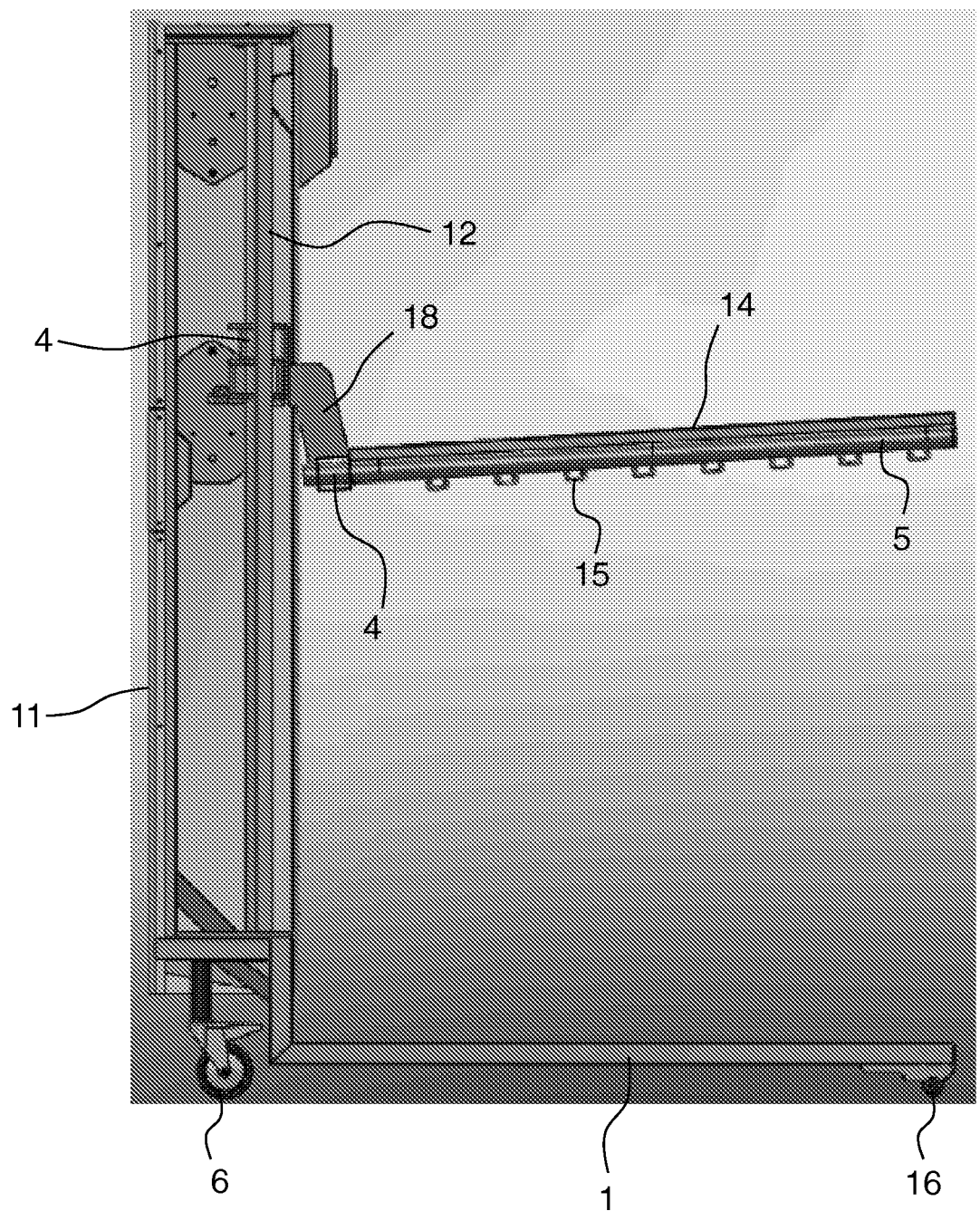
FIG. 4 in schematic form a lateral view, with a look into the housing, of the device from FIG. 3.

FIG. 4 shows the device, according to FIG. 3, in a side view, with the housing 11 open.

It can be seen that the table 14 is placed on the bars 5. The table 14 is connected to the lifting cross beam 4 by means of the bars 5; and the lifting cross beam in turn extends in the housing 11 and engages with the lifting mechanisms 12, located in said housing.

Eyelets 15 are provided on the bottom side of the bars 5; and these eyelets are used to suspend a cloth or a plurality of belts to hold the animal to be treated. Maximum variability is achieved. Variability and flexibility are achieved.

It is very clear in FIG. 4 that the bars 4 are arranged in such a way that they are at least slightly inclined towards the top in conformity with the previous embodiment.

Furthermore, FIG. 4 shows that the main frame 1 is equipped with two wheels 6, where in this case the wheels 6 are arranged in the rear region, directly below the housing 11 and, thus, below the lifting mechanisms 12, in order to be able to absorb the forces in those locations. Each of the wheels 6 is equipped with a brake for secure positioning. The main frame 1 extends towards the free end and ends there with adjustable feet 16, which are mounted underneath and which ensure a secure grip or, more specifically, a secure positioning on the substrate.

Figure 5:
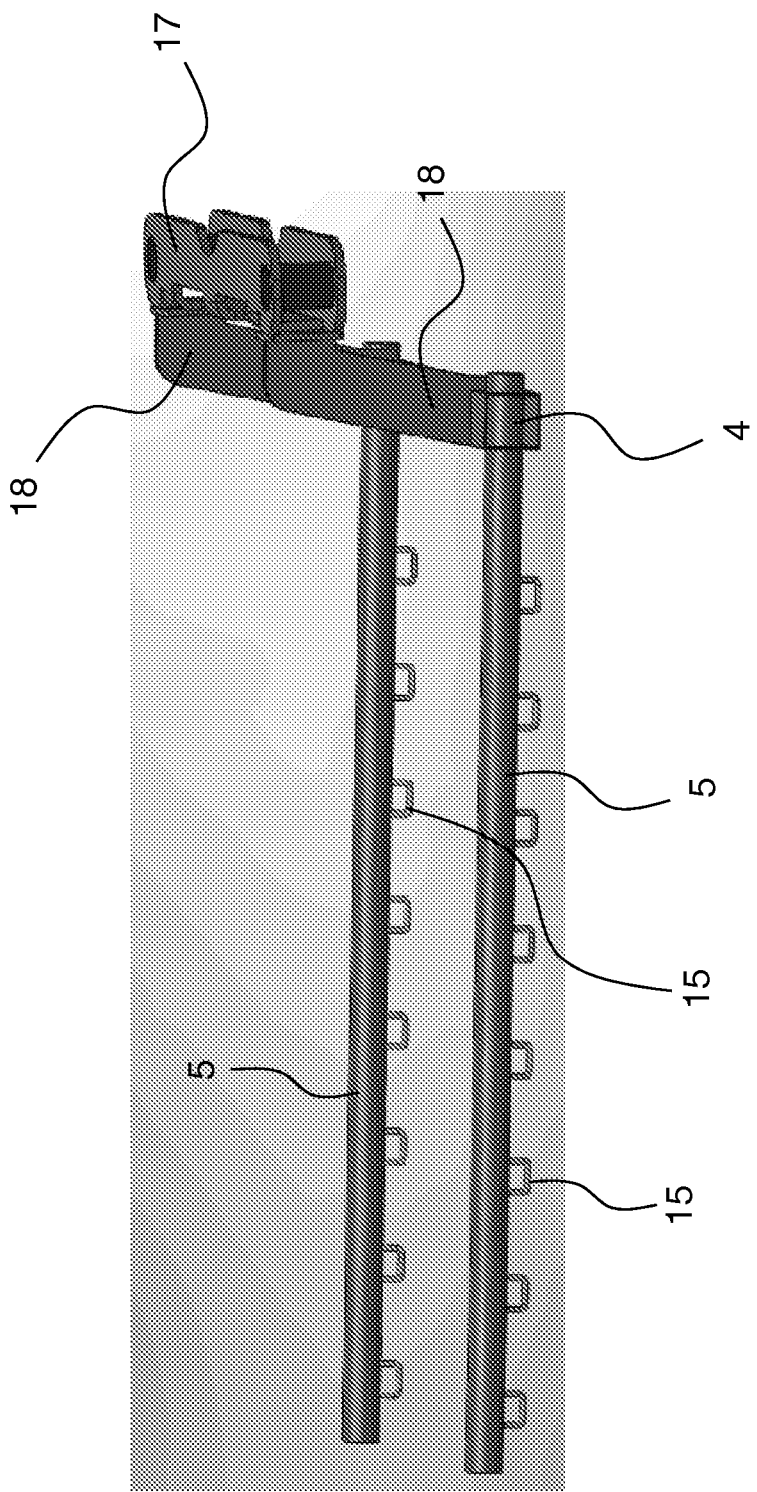
FIG. 5 the lifting cross beam, together with inserted bars, of the device from FIGS. 3 and 4.

FIG. 5 shows the lifting cross beam 4, which is equipped with coupling means 17 for coupling to the two lifting mechanisms 12. In the assembled state of the device the coupling means 17 are arranged inside the housing 11, while the lifting cross beam 4 is located outside the housing 11. With flat connecting means 18 the lifting cross beam 4 reaches through the vertical openings 13 of the housing 11 into the housing 11 and there engages with the lifting mechanisms 12 by means of the coupling means 17. As a result, a reliable operative connection is achieved.

With respect to the bars 5 it should be noted that these bars are provided on the underside with a row of eyelets 15 that are used to attach the straps, loops, etc. In particular, when straps or, more specifically, belts 19 are provided, it is possible to provide clamping means to adjust the length of the straps, belts 19, in order to be able to make an optimal adjustment. A wide range of different mechanisms are suitable.

Figure 6:
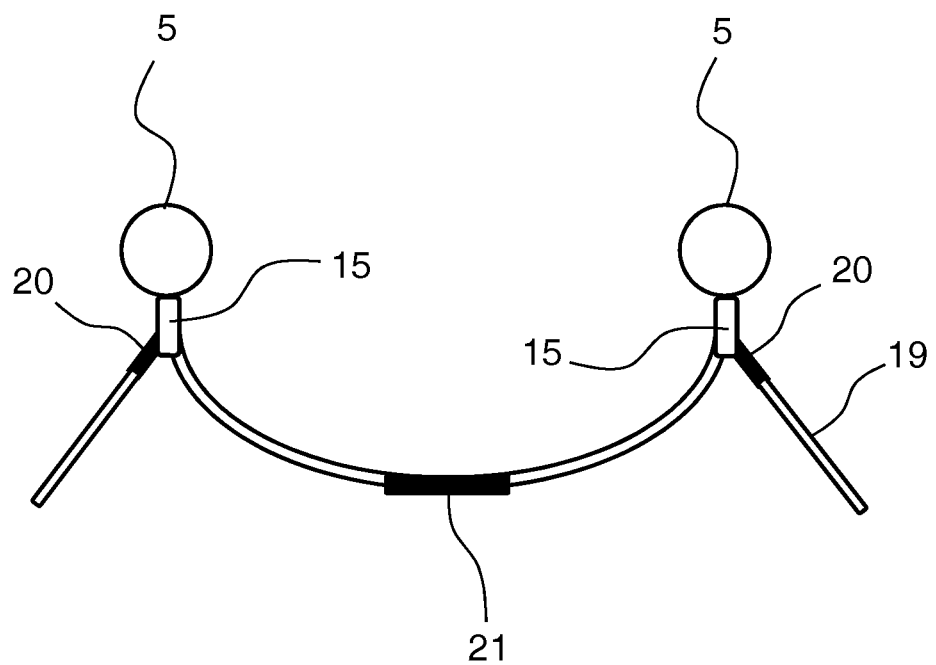
FIG. 6 in schematic form a front view of the two bars with straps, which are suspended from the bars, for carrying the animal, where for the sake of simplicity only the front-most strap is shown.

FIG. 6 shows in schematic form a front view of the free ends of the bars 5 and the attachment of a belt 19, which is fastened at both ends by means of the eyelets 15 with suitable clamping means 20, shown solely as an example. In the middle of the belt 19 there is a kind of mat 21 that lends itself exceptionally well to gently holding the animal by means of all of the straps or, more specifically, the belts 19.

With respect to other advantageous embodiments of the inventive device reference is made to the general part of the specification as well as to the appended patent claims in order to avoid repetition.

Finally it is explicitly pointed out that the above described exemplary embodiments of the inventive device serve only to explain the claimed teaching, but do not limit said teaching to the exemplary embodiments.

LIST OF REFERENCE NUMERALS

1 main frame
2 lifting device
3 column
4 lifting cross beam
5 bar
6 wheel
7 guide column
8 drive column
9 leg
10 remote control
11 housing
12 lifting mechanism (inside the housing, forms drive column)
13 opening (vertically in the housing)
14 table
15 eyelet (underneath the bar)
16 adjustable foot
17 coupling means (inside the housing)
18 connecting means (connects the lifting cross beam inwards into the housing and engages with the coupling means)
19 belt
20 clamping means
21 mat

The invention claimed is:

1. Device for lifting and positioning four legged animals, said device comprising:
   a main frame (1) to be placed on the ground or floor; and
   a lifting device (2) supported by the main frame (1),
   wherein:
      the lifting device (2) comprises a vertically positioned or positionable column (3),
      the vertically positioned or positionable column (3) comprises a vertically adjustable lifting cross beam (4),
      the vertically adjustable lifting cross beam (4) comprises two bars (5), the two bars projecting from the lifting cross beam, being spaced a distance from each other by securing of each of the two bars at different positions along the cross beam (4), and being configured to act as a holder for the animal,
      each of the bars (5) comprises a plurality of eyelets (15) integral with the bar (5) and extending along a length of the bars (5) on an underside side of the bars (5) facing the main frame (1),
      the plurality of eyelets (15) hingedly receive only a plurality of straps (19) therethrough, one of each of the plurality of straps (19) extending through a corresponding pair of each of the plurality of eyelets (15) such that each one of the plurality of straps (19) spans the distance between each of the bars (5) to support the animal on the plurality of straps (19), and
      respective free ends of each of the plurality of straps (19) are selectively adjustable in length on both sides of the eyelets (15) via a set of clamps (20) each positioned in direct contact with an exterior side of each of the plurality of eyelets (15), the selective adjustment facilitating positioning of the animal.

2. Device as claimed in claim 1, wherein the two bars (5) project from the lifting cross beam in an orthogonal direction.

3. Device, as claimed in claim 1, wherein the holder is adjustable to the size and shape of the animal.

4. Device, as claimed in claim 1, wherein a width of the lifting cross beam (4) is selectively adjustable.

5. Device, as claimed in claim 1, wherein either:
the lifting cross beam (4) has different docking points for the two bars (5) with self-locking effect against removal; or
the lifting cross beam (4) has mounting bolts or insertion openings for re-inserting the two bars (5) using the force of gravity.

6. Device, as claimed in claim 5, wherein either:
the two bars (5) are adjustable in length; or
the two bars (5) are telescoping bars.

7. Device, as claimed in claim 5, wherein the two bars (5) are selectively exchangeable for two bars (5) of different lengths.

8. Device, as claimed in claim 1, wherein the lifting cross beam (4) has two opposing ends and the different positions that the two bars are spaced along the lifting cross beam (4) are each intermediate and spaced apart from both of the two opposing ends.

9. Device, as claimed in claim 1, wherein, instead of the two bars (5) or in combination with the two bars (5), a panel is either placed on the two bars (5) or attached to the cross beam.

10. Device, as claimed in claim 1, wherein, instead of the two bars (5) or in combination with the two bars (5), a table is either placed on the two bars (5) or attached to the cross beam.

11. Device, as claimed in claim 1, wherein the lifting cross beam (4) runs either in or on the column (3).

12. Device, as claimed in claim 1, wherein the column (3) comprises a housing (11), which exhibits, at most, the width of the main frame (1).

13. Device, as claimed in claim 1, wherein the column (3) comprises at least one guide column (7) and at least one drive column (8) arranged either behind or adjacent to the at least one guide column.

14. Device, as claimed in claim 1, wherein the column (3) comprises two parallel, vertically arranged, synchronously operating lifting mechanisms (12), both of which support the lifting cross beam (4).

15. Device, as claimed in claim 14, wherein the lifting mechanism (12) is raised and lowered via at least one of a toothed rack, a chain, or a cable pull.

16. Device, as claimed in claim 1, wherein the lifting cross beam (4) is raised and lowered via at least one of a toothed rack, a chain, or a cable pull.

17. Device, as claimed in claim 1, wherein the lifting cross beam (4) is operated manually via a crank.

18. Device, as claimed in claim 1, wherein the lifting cross beam (4) is operated manually via an electric drive.

19. Device, as claimed in claim 18, wherein the drive is an electric motor inside the column (3).

20. Device, as claimed in claim 1, wherein the main frame (1) is designed as at least one of a U shaped frame or a yoke-type frame.

21. Device, as claimed in claim 20, wherein the main frame (1) comprises legs (9) configured to be at least slightly unfolded towards a free end of each of the legs, in order to make the base larger towards the free end.

22. Device, as claimed in claim 1, wherein the main frame (1) is equipped with four wheels (6), wherein at least two of the wheels (6) can be blocked.

23. Device, as claimed in claim 1, wherein the main frame (1) is equipped with two wheels (6) and two supporting feet, wherein the two wheels (6) can be blocked.

24. Device, as claimed in claim 1, wherein a remote control (10) is provided, in order to be able to operate the basic functions of the device, wherein a cell phone with a suitable organizer app can be used for the remote control.

25. Device, as claimed in claim 24, wherein the remote control (10) is a cell phone with a suitable organizer app.

26. Device, as claimed in claim 1, wherein the plurality of eyelets (15) are equally spaced along a majority of the length of the bars (5).

* * * * *